United States Patent [19]
Hensel et al.

[11] Patent Number: 5,218,752
[45] Date of Patent: Jun. 15, 1993

[54] DEVICE FOR THE FORMING OF COILS INSERTED INTO A STATOR OR ROTOR PLATE RACK

[75] Inventors: Edgar Hensel, Altenstadt; Edmund Gassner, Nidderau; Joachim Nasterlack, Bad Nauheim; Gerhard Albert, Niederdorfelden, all of Fed. Rep. of Germany

[73] Assignee: STATOMAT Spezialmaschinen GmbH, Fed. Rep. of Germany

[21] Appl. No.: 925,760

[22] Filed: Aug. 7, 1992

[30] Foreign Application Priority Data

Aug. 13, 1991 [DE] Fed. Rep. of Germany ....... 4126655

[51] Int. Cl.$^5$ ............................................. H02K 15/06
[52] U.S. Cl. ........................................ 29/736; 29/596; 29/598; 72/383
[58] Field of Search ................. 29/596, 598, 606, 736, 29/564.1; 72/353, 355, 392, 383

[56] References Cited

U.S. PATENT DOCUMENTS 3,913,373 10/1975 Kindig ............................ 29/736 X
4,051,595 10/1977 Bale ...................................... 29/596

FOREIGN PATENT DOCUMENTS 54-43161 12/1979 Japan .
62-48240  3/1987 Japan .

*Primary Examiner*—Carl E. Hall
*Attorney, Agent, or Firm*—Larson and Taylor

[57] ABSTRACT

A device is provided for forming coils which are inserted into radially inwardly open slots of a stator or rotor plate pack of an electric machine. The device enables intermediate forming of coils disposed in specific slots in order to also allow insertion of the coils of a further winding in the same slots and thus allow free forming. The device comprises a holding device for the plate pack and a forming mandrel. The latter includes a plurality of radially extendable laminae distributed about the periphery thereof. Different groups of laminae can be extended by a predetermined radial path length by push rods which can be driven independently of one another in order to force outwardly, and form in certain slots, the coil strands that have been inserted into the slots. Further, forming rings which are axially movable relative to the plate pack are provided to enable forming of winding heads.

12 Claims, 1 Drawing Sheet

DEVICE FOR THE FORMING OF COILS INSERTED INTO A STATOR OR ROTOR PLATE RACK

FIELD OF THE INVENTION

The invention relates generally to a device for the forming of coils which are inserted into radially inwardly open slots of a stator or rotor plate pack of an electric machine, and more specifically, to a device utilized in free forming of such coils.

BACKGROUND OF THE INVENTION

Devices for forming coils which are inserted into slots of a rotor or stator are described in U.S. Pat. No. 4,106,189, the Japanese patent 54-43 161, and Japanese patent application publication 62-48 240. These patents disclose devices which serve to force the inserted coils radially outward in specific slots of a stator or rotor plate pack in order to allow further layers of coils, or coils of an auxiliary phase, to be inserted. Additionally, insulation strips can be inserted into the slot. This process is referred to as free forming or intermediate forming.

The previously known devices for forming coils in stator or rotor slots have the deficiency of only being suitable for a very specific winding pattern of a specific stator or rotor with radially inwardly open slots. However, four-pole and two-pole motors, for example, are often manufactured which have the same plate section for the stator. In such cases, it is necessary to provide a special forming device even if the dimensions of the stator plate pack are the same for each type of motor, i.e., one forming device for each winding pattern is necessary. The basic difference between the various forming devices is simply that laminae are extended radially with a different distribution around the periphery in order to displace the coil strands outwardly, i.e., to form the coil strands in the slots allocated to the laminae. In this process, the goal is to have the laminae undergo a very specific movement up to a predetermined final position. This will not occur if all laminae are advanced radially with even pressure in accordance with U.S. Pat. No. 4,106,189, because the laminae can reach different final positions depending on the randomly varying positions of the coil wires in the slots.

SUMMARY OF THE INVENTION

According to the invention, a device for forming of coils inserted into a stator or rotor plate pack is provided which allows for the placement of coils in stator or rotor plate packs having differing winding patterns. The device enables intermediate forming of coils disposed in specific slots in order to also allow insertion of the coils of a further winding in the same slots and thus allow free forming.

The device of the invention allows several different groups of laminae to be selectively advanceable radially. This means that the user can specify, for each winding pattern in question, a group of laminae distributed around the periphery of the rotor or stator which are to be extended radially during the forming process, and the laminae which have not been selected are not activated or extended.

In order to selectively extend one group of laminae at a time, the preferred embodiment of the invention provides that the laminae or several laminae are arranged adjacent to each other and have a slide drive which can be actuated independently of the slide drive of the other laminae. It should be noted that the groups of lamina can partially comprise the same laminae. The slide drive preferably comprises a plurality of push and draw rods which are distributed around the periphery of the laminae and extend parallel to the laminae, are to be driven in longitudinal direction, and act radially on the laminae in a direct or indirect manner. This can be accomplished, for example, in such a way that the push or draw rods press radially, via at least one radially outer wedge surface, against an opposing surface which cooperates with the wedge surface onto one or more laminae. Restoration to the initial position of the push or draw rods can be provided by springs which preferably extend axially at the front end of the laminae and act via inclined surfaces radially on the laminae. With this arrangement, the restoring springs can be accommodated within the periphery of the stator boring. Because the spring position is not necessary at the rear end of the laminae, the restoring springs can also be arranged here in radial alignment.

In order to guide the laminae during their radial movement, the laminae are held radially inwardly in guide grooves which extend longitudinally in the wedge surfaces and are disposed radially externally in gaps between guide rods. Furthermore, the laminae can be guided at their axial ends.

In a further preferred embodiment of the invention, the slide drives have a common drive element which can be selectively coupled by individually controllable coupling elements having different groups of draw or push rods.

No difficulties are presented by controlling one group of coupling elements and then another group of coupling elements, whereby differing groups of coupling elements can partially comprise the same coupling elements. These coupling elements are preferably connected with the common drive element and should each be positively engaged individually with one draw or push rod each.

In order to be able to form the part of the coils which protrudes axially from the stator slots, i.e., the so-called winding heads, in accordance with a further embodiment of the invention, forming rings are provided which are slidable concentrically to the central longitudinal axis, axially relative to one other, and which are provided with slots through which the laminae extend.

For reasons of expedience, the forming rings have a drive which can be actuated independently of the slide drive of the laminae so that the respectively desired laminae can be optionally extended radially, or the forming rings can be moved axially up to a specific final dimension from the stator plate pack, or a combination of both movements can be provided.

Overall, the forming device of the invention enables (1) intermediate forming of coils lying in specific slots in order to also insert the coils of a further winding in the same slots as mentioned above, (2) free forming, for example in the case of three-phase motors, in order to force back radially outwardly the coils of the previously inserted layers inserted into specific slots with the objective of inserting a further layer of coils into other slots, and (3) final forming in order to provide the entirety of the inserted coils, including the winding heads, in their final form.

Other features and advantages of the invention will be set forth in, or apparent from, the following detailed description of the preferred embodiment of the invention.

DESCRIPTION OF THE PREFERRED EMBODIMENTS

Figure 1:
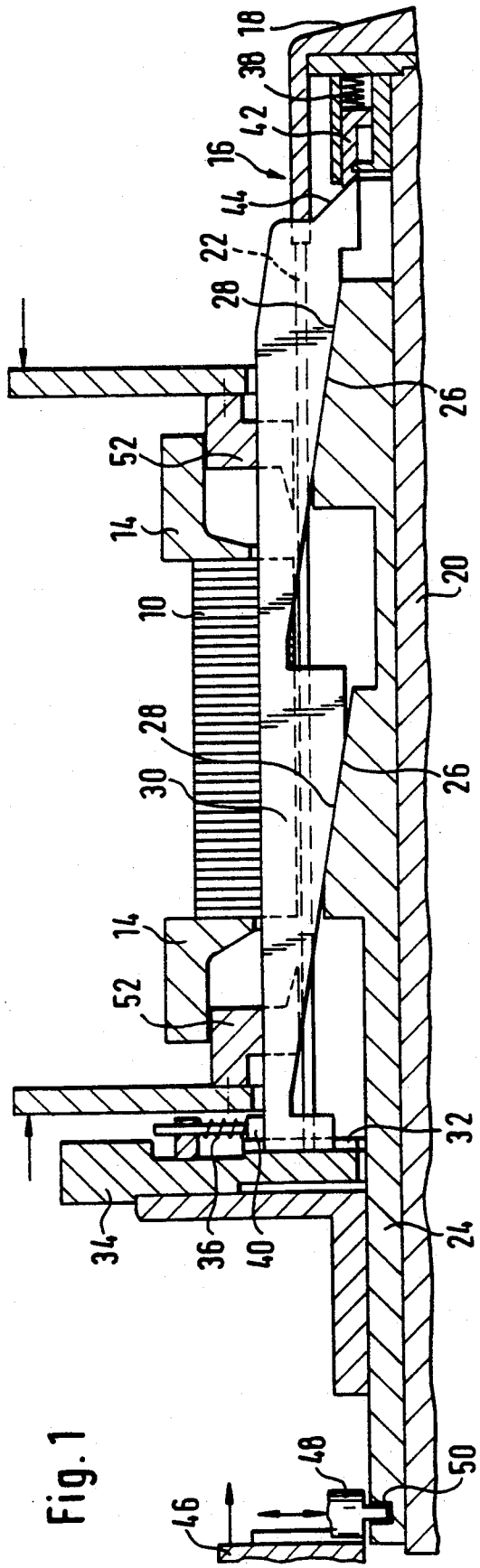
FIG. 1 is a simplified longitudinal cross section of a forming device constructed in accordance with a preferred embodiment of the invention.
Figure 2:
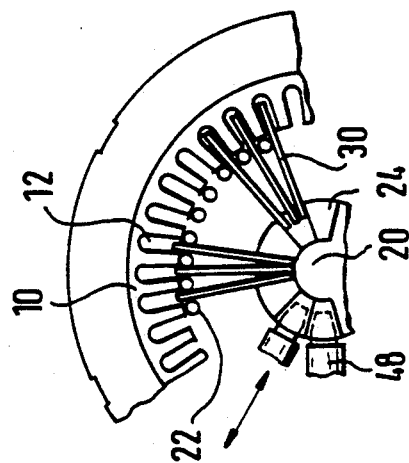
FIG. 2 is a partial cross-section of the device of FIG. 1.

Referring to FIGS. 1 and 2, a stator plate pack 10 with radially inwardly open slots 12 is clamped in a holding device 14. By means of an axial relative movement a forming mandrel, generally designated 16, can be inserted into the stator boring (not shown). The forming mandrel 16 has a conical front end 18 which, during the infeed movement, forces back and radially outwards the coil parts that protrude into the cross-section of the stator boring.

Further, forming mandrel 16 has a supporting frame comprising a central axis 20, which as shown in FIG. 2 is of round cross-section, and a crown of outer guide rods 22.

On central axis 20, twelve push rods 24 are evenly distributed around the periphery of axis 20 and are axially slidable thereon. Each push rod 24 has a sector-shaped cross-section which can be seen in FIG. 2. At an axial spacing radially outwardly from the central axis 20, two wedge surfaces 26 are disposed. Wedge shaped surfaces 26 taper towards the front end of the forming mandrel 16. Push rods 24 lie with their radially inner straight surfaces up against the round central axis 20. Alternatively, the radially inner surface could have a duodecagonal cross-section in the case of twelve push rods 24, or the radially inner surface of the push rods 24 could be rounded corresponding with the diameter of the central axis 20, if required by the surface pressure thereon.

Wedge surfaces 26 of each push rod 24 are in contact with corresponding wedge-shaped opposing surfaces 28 of three peripherally adjacent laminae 30, each of the laminae extending radially and axially. Each lamina 30 is radially outwardly slidably guided between two guide rods 22. In order to also guide the laminae 30 at their radial inner edge, the wedge surfaces 26 are provided with axial longitudinal grooves (not shown) into which laminae 30 engage. Moreover, laminae 30 are guided at their rear end in radially extending guide grooves 32 inside an enclosure component 34 of the guide mandrel 16.

By moving a push rod 24 axially forward relative to the central axis 20, the three corresponding laminae 30 are pressed radially outwards as a consequence of the respective movements of cooperating wedge surfaces 26 and 28. To reset laminae 30 radially inwards again when the push rod 24 is withdrawn, radially extending springs 36 are provided at the rear end and axially extending springs 38 at the front end 18. Each spring 36 is radially outwardly supported on a spring bearing connected to the enclosure component 34 and presses onto the radial outer edges of three adjacent laminae 30 via a segmental piece 40. Each spring 38 is supported on the front enclosure component 18 of the guide mandrel 16 and presses upon front wedge surfaces 44 of three adjacent laminae 30, via a segmental piece 42 guided axially slidable inside front end 18 and having a rear cone surface, in contact with the laminae 30, which tapers towards the front.

Guide mandrel 16 further comprises a drive element 46 which is axially advanceable and withdrawable relative to central axis 20 and which essentially is ring shaped. A hydraulic cylinder, for example, can serve as drive element 46. In this example, twelve pneumatic cylinders (not shown), each aligned radially and having coupling elements 48 which are radially slidable by means of the pneumatic cylinders are mounted to drive element 46 and evenly distributed around the periphery thereof. Each coupling element 48 is movable by actuation of one of the pneumatic cylinders between a radially outward, withdrawn neutral position and a radially inward, advanced drive position in which said coupling element 48 engages positively in a slot or boring 50 in a push rod 24. The pneumatic cylinders of the coupling elements 48 can be controlled individually and in randomly formed groups so that by means of the common drive element 46 a random group of push rods 24 can be advanced to the front end of guide mandrel 16 and thereby the corresponding group of laminae 30 can be radially extended.

The forming device also comprises a unit or facility for the forming of the coil winding heads (not shown) which protrude axially from the stator plate pack 10. This capability is provided by two axially slidable, guided forming rings 52 which press the winding heads radially outwardly and against the front surfaces of the stator plate pack 10 by means of conical or ring-shaped spherical surfaces. The forming rings 52 can each be advanced up to a predetermined spacing from the front surfaces of the stator plate pack 10.

It is to be understood that the drive and guide elements of laminae 30 can also be implemented differently than shown and described above. For example, the push rods 24--and laminae 30 can also be connected to each other via parallel linkage rods, or guide pins on laminae 30 or the pus-h rods 24 could engage in slanted guide grooves on the other respective part. The number of laminae 30 which are actuated by each push rod 24 depends (just as does the number of push rods 24) on the size of the stator plate pack, i.e., on the space available, and on different winding patterns which respectively require differing groups of radially extendable laminae.

Instead of the push drive 46 for extending laminae 30, a draw drive can also be provided. Instead of a single drive element 46 and coupling elements 48 which are controllable singly or in groups, in another alternative embodiment, individual drive elements can be provided for each push rod 24 which can be controlled individually or selectively in different groups. The length of the radial travel path of laminae 30 can be predetermined and altered by corresponding control of the axial travel path of drive element 46. When manufacturing a specific stator the possibility thus exists of initially feeding radially a first group of laminae 30 by a specific path length into a first group of slots and later penetrating by another radial path length into other slots with another group of laminae 30.

The forming rings 52 can be actuated independently of laminae 30. Depending on the forming desired, forming rings 52 can therefore optionally be actuated selectively in the same work operation as laminae 30 or even in a separate work operation individually, in order to bring only the winding heads into a specific form at the end of the production process. As can be seen in FIG. 1, forming rings 52 and laminae 30 must penetrate each other. For this purpose forming rings 52 have axial through slots, through which laminae 30 extend.

In the practical embodiment shown, push rods 24 are directly adjacent to one other and as a consequence, the push rods 24 that are advanced axially in a certain work operation slave-drive the adjacent push rods for part of the path. However, this causes no interference because the slave-driving ceases as soon as laminae 30 is moved radially outwards and generates a resistance to the movement of the slave-driven push rods 24. In order to withdraw the slave-driven push rods 24 back to the initial position, provision is made that in the advanced position of the drive element 46 all coupling elements 48 are infed radially inwards against the push rods 24 so that in the course of retreat they engage into the borings or slots 50 of the slave-driven push rods 24 and also withdraw the latter again to the initial position.

Although the present invention has been described relative to specific exemplary embodiments thereof, it will be understood by those skilled in the art that variations and modifications can be effected in these exemplary embodiments without departing from the scope and spirit of the invention.

We claim:

1. A device for forming of coils which are inserted into radially inwardly open slots of a plate pack of an electric machine, said device comprising: a holding device for clamping a plate pack of an electric machine and a forming mandrel arranged coaxially with a central longitudinal axis of the plate pack and being insertable into a bore in the electric machine, said mandrel comprising a plurality of laminae, arranged in groups of at least one individual lamina, which can be advanced radially into slots of the plate pack, a plurality of selectively drivable movement transmission members, located radially inwardly of the plate pack, for, when driven, providing movement of corresponding groups of laminae from inner, rest positions to predetermined end positions of equal radius, drive means for driving the movement transmission members, and control means for selecting the movement transmission members to be driven by said drive means.

2. The device recited in claim 1, wherein said movement transmission members each comprise a slide drive for a corresponding one of said groups of laminae which can be actuated independently of the slide drive of the other laminae groups.

3. The device recited in claim 2, wherein said slide drives comprise a plurality of rods which are distributed around the periphery thereof, extend parallel to said laminae, are driven in longitudinal direction and act radially on said laminae.

4. The device recited in claim 3, wherein said rods press radially, by means of at least one radially outer wedge surface, against an opposing cooperating surface of at least one laminae.

5. The device recited in claim 3, further comprising means for providing a radially inwardly directed spring force which acts as a restoring force on said laminae.

6. The device recited in claim 5, wherein the means for providing a spring force comprises axially extending springs which are arranged at a front end of said laminae and can be inserted into the plate pack, said springs acting radially on said laminae through an inclined surface.

7. The device recited in claim 4, wherein said laminae are guided at the respective radial inner edges thereof in longitudinally extending guide grooves in said wedge surfaces and are guided adjacent the respective radially outer edges thereof in gaps between guide rods.

8. The device recited in claim 3, wherein said rods are slidable by a common drive element which is selectively coupled by individually controllable coupling elements to said rods.

9. The device recited in claim 8, wherein said coupling elements are connected to said common drive element and can each be individually positively engaged with a rod.

10. The device recited in claim 8, wherein, in the position of said drive element in which said laminae are radially advanced, the non-coupled coupling elements of said coupling elements can be fed against said rods so that, during a return stroke of said drive element, said non-coupled coupling elements are coupled with corresponding rods which have been slave driven by frictional resistance as said drive element advanced during a forward stroke.

11. The device recited in claim 1, further comprising forming rings for forming winding heads which protrude axially from the plate pack, said forming rings being arranged concentrically to the central longitudinal axis of the plate pack and being axially movable relatively to one another, said forming rings including slots therein and said laminae extending through said slots in said forming rings.

12. A device for forming of coils which are inserted into radially inwardly open slots of a plate pack of an electric machine, said device comprising: a holding device for clamping a plate pack of an electric machine and a forming mandrel arranged coaxially with a central longitudinal axis of the plate pack and being insertable into a bore in the electric machine, said mandrel comprising a plurality of laminae, arranged in groups of at least one individual lamina, which can be advanced radially into slots of the plate pack, and selectively actuable movement control means, located radially inwardly of the plate pack, for providing movement of said groups from rest positions to predetermined end positions of equal radius, said movement control means comprising a plurality of slide drives each of which, when actuated, provides movement of a corresponding group to the end position thereof independently of the slide drives of the other groups, and drive means for selectively actuating said slide drives.

* * * * *